(12) United States Patent
Jochiong et al.

(10) Patent No.: US 6,851,068 B2
(45) Date of Patent: Feb. 1, 2005

(54) SYSTEM FOR REMOTELY CONTROLLING POWER CYCLING OF A PERIPHERAL EXPANSION SUBSYSTEM BY A HOST

(75) Inventors: Victor E. Jochiong, Mill Valley, CA (US); Truong T. Nguyen, San Jose, CA (US); Balkar S. Sidhu, San Jose, CA (US); Diane S. Lee, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 627 days.

(21) Appl. No.: 09/764,492

(22) Filed: Jan. 17, 2001

(65) Prior Publication Data

US 2002/0095611 A1 Jul. 18, 2002

(51) Int. Cl.[7] .................................................. G06F 1/28
(52) U.S. Cl. ............................ 713/330; 713/340; 710/2
(58) Field of Search ................................. 713/300, 310, 713/320, 322, 323, 340, 330; 710/2, 62

(56) References Cited

U.S. PATENT DOCUMENTS

| | | | |
|---|---|---|---|
| 5,764,924 A | 6/1998 | Yamada | |
| 5,781,747 A | 7/1998 | Smith et al. | |
| 6,121,849 A | * 9/2000 | McCollough et al. | 331/175 |
| 6,317,839 B1 | * 11/2001 | Wells | 713/320 |
| 6,629,248 B1 | * 9/2003 | Stachura et al. | 713/340 |
| 6,633,988 B2 | * 10/2003 | Watts et al. | 713/322 |
| 6,668,334 B1 | * 12/2003 | Abel et al. | 713/500 |

* cited by examiner

*Primary Examiner*—Lynne H. Browne
*Assistant Examiner*—Thuan Du
(74) *Attorney, Agent, or Firm*—Meyertons Hood Kivlin Kowert & Goetzel P.C.; B. Noël Kivlin

(57) ABSTRACT

A system and method for remotely power cycling a peripheral subsystem. A host system to remotely control the power cycling of a peripheral subsystem, without the need to include or add any dedicated or special signals beyond those needed for the normal interface between the host system and peripheral subsystem. A peripheral subsystem according to the present invention includes circuitry that senses the presence of a downstream, running switching signal such as a clock line or any "heart beat" type signal such as a clock pulse and initiates the power up event of the peripheral system. Conversely, the same circuitry also senses the absence of a downstream signal and initiates a power down event of the peripheral subsystem.

20 Claims, 5 Drawing Sheets

| FIG. 2A | FIG. 2B |

SYSTEM FOR REMOTELY CONTROLLING POWER CYCLING OF A PERIPHERAL EXPANSION SUBSYSTEM BY A HOST

BACKGROUND OF THE INVENTION

1. Field of the Invention

The present invention in general relates to peripheral expansion systems, and more particularly this invention relates to a system and method for remotely power cycling a peripheral expansion subsystem.

2. Description of the Related Art

Computer systems such as laptop, workstations and severs typically include a processor, memory, and local bus over which the processor communicates with peripheral devices attached or connected to the computer system. For example, the PCI or peripheral component interconnect is one industry standard which provides a high performance, local bus architecture at a low cost. It is intended to be a common I/O component interface across different platforms. The PCI interface, however, is subject to several limitations. One such limitation is that the PCI bus has been architected to connect components located close to one another. Typically, the components need to be within a certain distance of each other. In addition, the trace length for peripheral add-in devices is limited to 1.5 inches from the motherboard of the computer for the PCI signal and 2.5 inches for the primary clock. This limitation is to ensure proper timing of the PCI signal to and from the peripheral device, and is documented in the PCI Local Bus Specification Revision 2.1—Production Version, Dated Jun. 1, 1995. Lastly, there is a limitation to the number of loads that can be presented to the PCI local bus. The current PCI bus specification limits the maximum number of add in cards to four when operating at 33 MHz, and to two when operating at 66 MHz. In higher end computer systems or servers that have a higher number of peripheral devices or field replaceable units (FRUs) and perform I/O operations at higher bandwidth, these limitations have significant impact. Often, there are simply not enough expansion slots in the system to accommodate the peripheral devices desired.

To address such limitations, peripheral subsystems may be used. A peripheral subsystem connects to a host or computer system and allows for additional slots for peripheral components. A host interface card occupies a PCI compliant slot in the host system and expansion system, and connects the two over a transmission medium. See, for example, U.S. Pat. No. 5,781,747 issued to Smith et al., and U.S. Pat. No. 5,764,924 issued to Hong.

A peripheral subsystem typically must operate when the corresponding host system is operational, for example, powered up. In many environments, the powering up of the peripheral subsystem must be synchronized to the host system's power up event. This requirement may be critical if the host system executes boot-up firmware and/or operating system load initialization programs, whereby the hardware configuration must be recognized and/or the software device drivers must be installed.

This synchronized event can be readily accomplished by manually powering up the peripheral subsystem first, followed by the manual power up of the host system.

There are many other system application environments, where it is also highly desirable and/or a system requirement that this synchronized event be possible without manual intervention, for example in a remotely monitored data center. In these applications, the power up sequence is typically started via some form of communications link to the host itself, such as a modem line, serial line or a LAN connection. However, there is no assurances the peripheral subsystem will be powered up as needed by the host system. In addition, as there is a need to be able remotely synchronize the power up routine, there is also a need to remotely control the power down event.

Thus, there is a need in the art to address the power cycling needs of a peripheral expansion system. It can be seen that a peripheral subsystem needs to be remotely powered on when the host system it is connected to is powered on, and similarly the remote power system needs to be powered off when the host system is powered off. Moreover, to meet the high availability, minimal space utilization requirements of today's data centers, the power up and power down sequencing ability should be low cost, simple and easy to use.

SUMMARY OF THE INVENTION

To overcome the limitations in the prior art described above, and to overcome other limitations that will become apparent upon reading and understanding the present specification, the present invention discloses a system and method for remotely power cycling a peripheral subsystem. Further disclosed is a system and method that allows a host system to remotely control the power cycling of a peripheral subsystem, without the need to include or add any dedicated or special signals beyond those needed for the normal interface between the host system and peripheral expansion subsystem.

Briefly stated, one embodiment of a system according to the present invention includes circuitry in the peripheral expansion system that senses the presence of a downstream, running switching signal such as a clock line or any other "heart beat" type signal and initiates the power up event of the peripheral subsystem. Conversely, the same circuitry also senses the absence of a downstream signal and initiates a power down event of the peripheral subsystem.

In one embodiment, the host system is a thin network server, having a processor, memory, a host peripheral device bus and space for one or more peripheral devices in slots off the host bus. The host local bus may be for example a PCI bus.

In one embodiment, the peripheral subsystem may be a peripheral expansion subsystem, having a power supply unit, and also including a local bus with slots for one or more peripheral devices. This local bus may be for example, a PCI bus.

In one embodiment, a host interface card is installed into one of the PCI compliant slots in the host system and connects to a PCI I/O port on the host system. Over a communications link to a PCI I/O port on the peripheral subsystem, the host system may send signals to the peripheral subsystem.

In one embodiment, the downstream signal may be a PCI clock signal. Other embodiments may include a serialized version of a PCI signal transmitted over a high speed serial link, including a wireless transmission of the signal.

In one embodiment, the downstream signal may come from a host system to the peripheral subsystem. In other embodiments, the signal may come from an upstream peripheral subsystem, if the peripheral subsystems are in a cascade configuration.

One method according to the present invention includes sensing if a monitored signal is present, if the signal is present powering up the peripheral subsystem, and if the signal is not present, powering off the peripheral subsystem. The method of the present invention eliminates the need for manual power cycling of the peripheral subsystem.

Further aspects of the present invention will become apparent from the following description of the preferred embodiment.

BRIEF DESCRIPTION OF THE DRAWINGS

A better understanding of the present invention can be obtained when the following detailed description is considered in conjunction with the following drawings in which.

Figure 1:
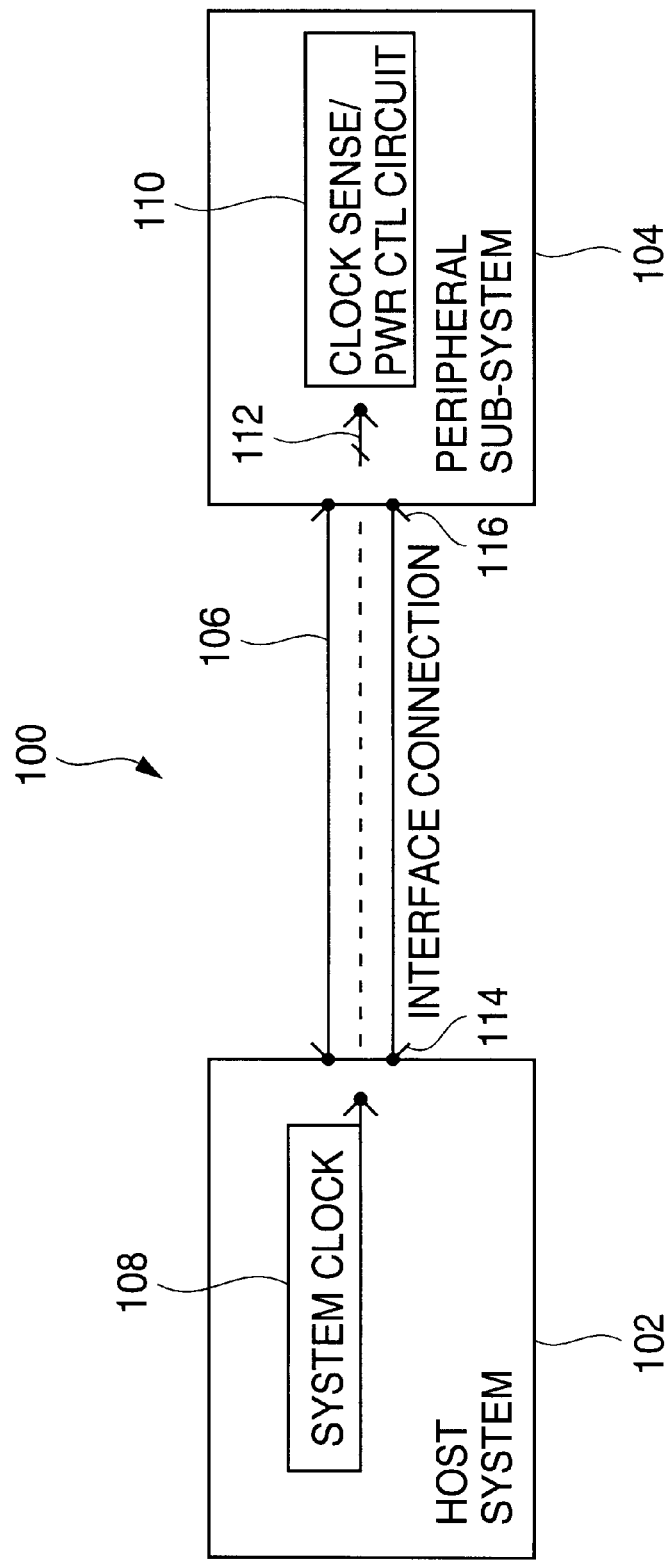
FIG. 1 is a block diagram showing a computer system including a host system and a peripheral subsystem according to the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENT

FIG. 1 illustrates one embodiment of a system 100 including a host system 102 and a peripheral subsystem 104 connected via a transmission medium 106 or interface connection. Host system 102 may be any type of computer system designed to include a host processor, memory and a peripheral device bus . This, for example, can be a workstation or server device. One example of a computer system according to the invention might be the Sun's Netra™ T or T 1120 telecommunications server including one or two 64 bit UltraSPARC™ II processors, 1 or 2 GB main memory, a 66 MHz host PCI bus and PCI I/O port, and network interfaces for Ethernet, Fast Ethernet, STP or MII. This computer system enclosure may be designed to fit in 19, 23, 24 inch, 600 mm racks for horizontal scalability and may be certified to meet or exceed the Network Equipment Building System (NEBS) Level 3 standards. The aforementioned is for exemplary purposes only, and it is understood that any computer system such as a workstation or server having any local host bus such as a host PCI bus would be within the scope of the present invention.

Connected to the host system 102 is transmission media 106 which transmits a signal from the host system 102 to the peripheral subsystem 104. This may be a coaxial cable, fiber optic cable, or twisted pair, for example. In one embodiment, this may be a coaxial cable connected to PCI I/O ports. In one embodiment, this may be a high speed serial link. The data transmission protocol might be for example Ethernet, or Fiber Channel. In still other embodiments, the physical connection (transmission media 106) may be foregone and instead it could be a wireless transmission protocol such as those described by industry standards like IR or Bluetooth. Connectors 114 and 116 connect the transmission media 106 to the host system 102 and peripheral system 104 respectively. Connectors 114 and 116 may be PCI I/O ports on the host system and peripheral subsystem respectively.

The host system 102 and the peripheral expansion subsystem 104 may be colocated for example within the same rack mounting in a data center or may be in geographically distinct locations. Peripheral subsystem 104 may comprise a chassis, a local bus, such as a PCI bus and PCI compliant expansion slots adapted to receive peripheral devices, and a power supply unit. Peripheral devices may be, for example tape drives, storage devices, CD roms, etc. One example of an expansion unit or peripheral subsystem might be the Sun's Netra™ E1 Expansion Unit, which increases the I/O capacity of a system by providing additional PCI slots. In this example, the peripheral subsystem may be connected to the host system over the PCI I/O port using a host interface card in one of the PCI card slots.

Figures 2, 2A:
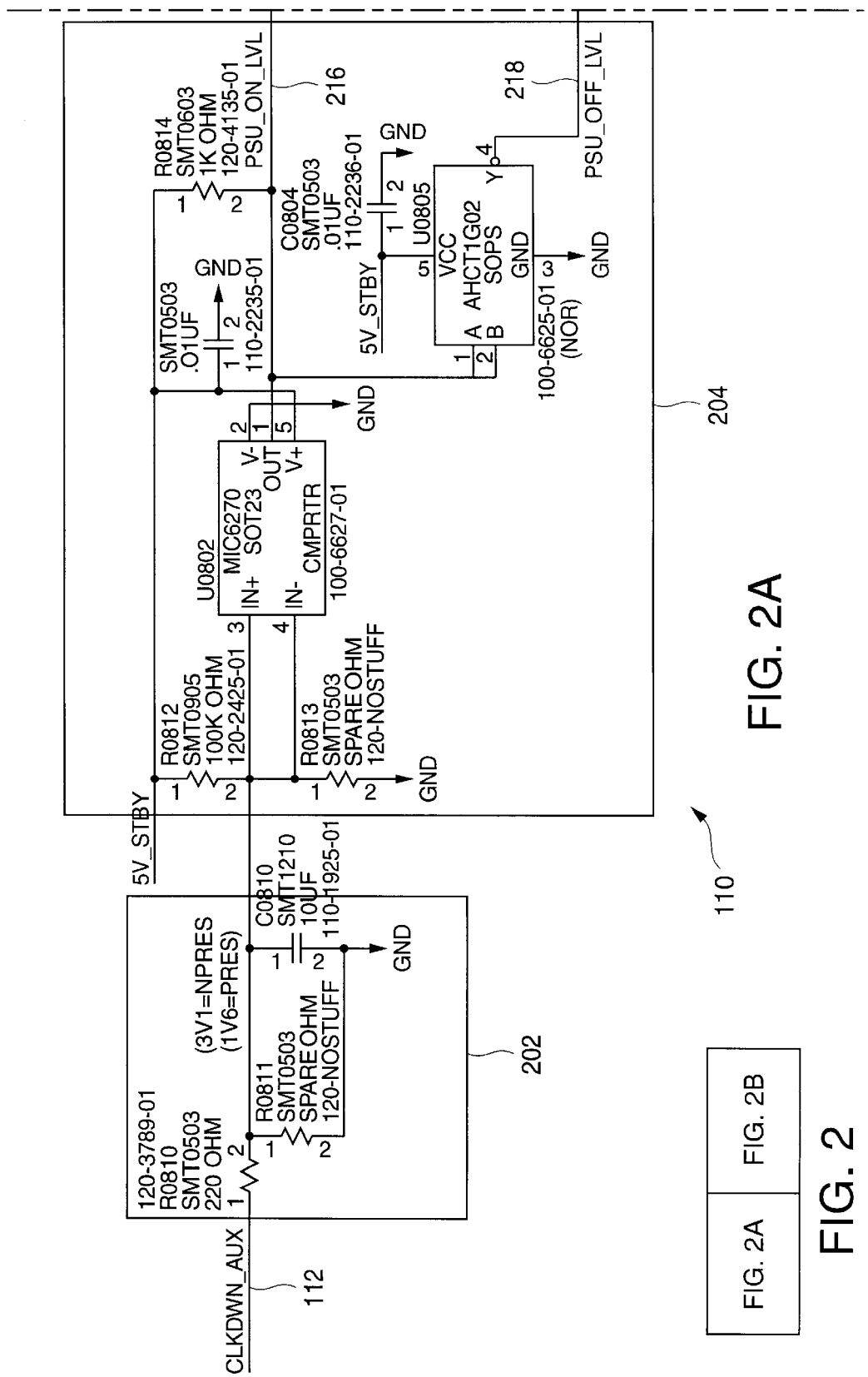
FIG. 2 is a circuit diagram showing the circuitry for sensing the presence or absence of a heartbeat signal.
Figure 2B:
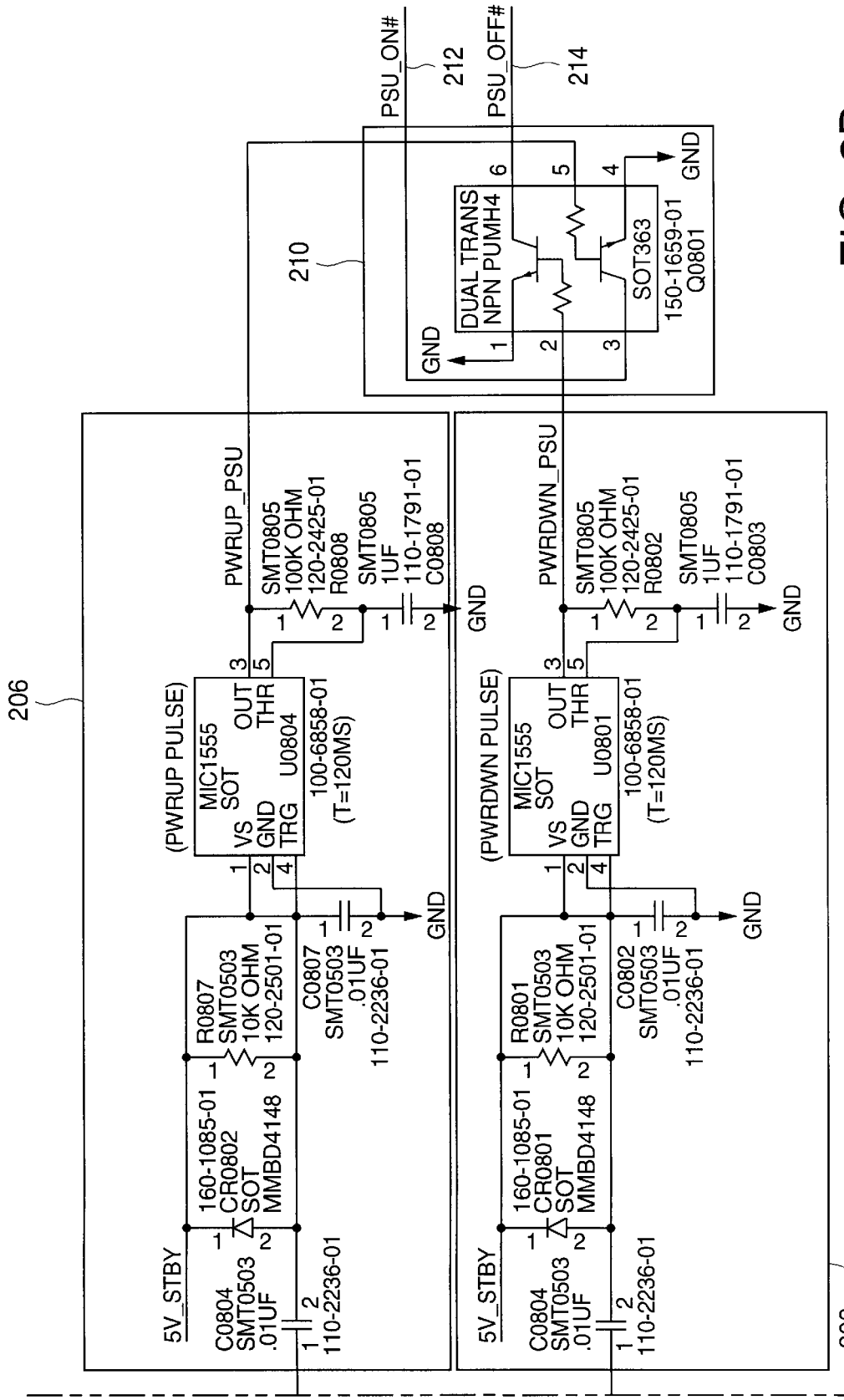

FIG. 2 illustrates a circuit diagram for the power control signal sensing circuitry 110 located in the peripheral subsystem 104. The downstream signal is represented by 112, and may be for example a PCI clock signal. The signal passes through an RC low pass filter 202 and into a comparator circuit 204. Here, the circuitry compares the incoming signal to some threshold value. For example, a threshold voltage of 3.1 or 2.5 may be used. If the voltage on the incoming signal is higher than some predetermined threshold value, the comparator circuit triggers the power up pulse circuit 206 along lead line 216. This circuitry powers up the power supply unit by sending a signal along trace line 212 in the peripheral subsystem so that the subsystem is on and available when the host system completes its power up routine. This is helpful in instances when host system initialization software needs visibility to devices to configure those devices at start up time. This feature also helps the entire system to be up and available in a shorted period of time, rather than sequentially powering up the host system and peripheral subsystems.

Still in connection with FIG. 2, in comparator 204, if the voltage on the incoming signal 112 is lower than the threshold value, this indicates that the heartbeat signal is not present and a power down pulse is triggered in the circuit at 208. This will power down the power supply unit in the peripheral subsystem by sending a signal along trace line 214, which may be helpful in disabling peripheral devices when the host system is powered down. In the event the power supply unit is not on, then in the absence of reaching a threshold value in the comparator, the power supply unit simply remains off.

Power control circuit 110 may further include an interface transistor 212 which functions as an open collector of signals.

In one embodiment, the incoming signals is a PCI clock signal. In an alternative embodiment, this may be some other form of downstream signal where a change in voltage or current may be detected.

Power control circuit 110 as shown and described in FIG. 2 is used for exemplary purposes only, and it is contemplated that one skilled in the art could modify without departing from the spirit and scope of the invention.

Figure 3:
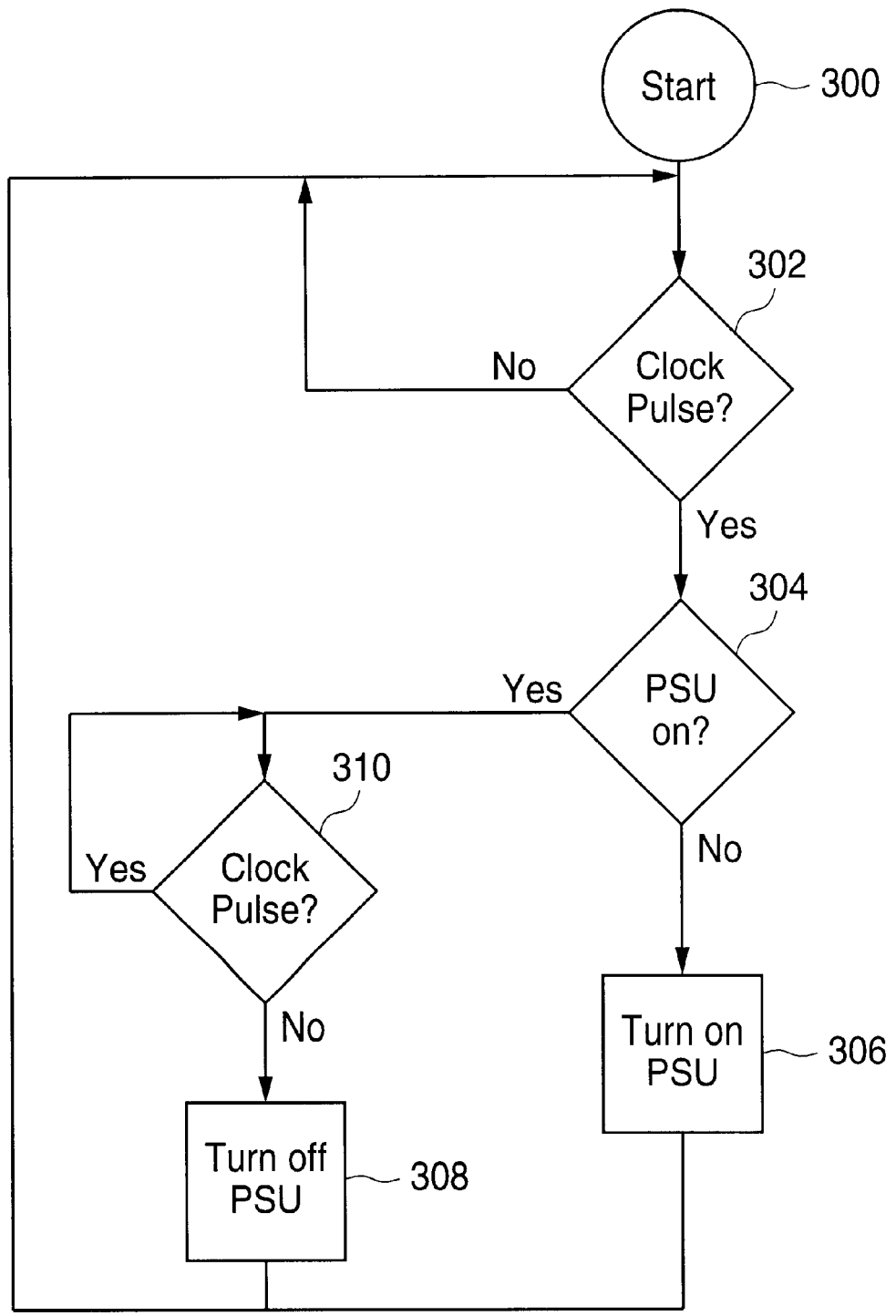
FIG. 3 is a flow diagram of a method for remote power cycling the peripheral subsystem.

A method according to the present invention is shown and described in connection with the flow diagram of FIG. 3. Here, a method for remotely power cycling a peripheral subsystem starting at 300 comprises the steps of first checking an incoming signal received to determine if a clock pulse is present 302. This signal is received from over a transmission media from for example a host system or another peripheral subsystem. If the clock pulse is present on the signal received, then the power supply unit (PSU) may be checked to determine if the power supply unit is on 304. If the PSU is off, the PSU is powered on 306. Alternatively, a power on signal may be automatically sent, eliminating the check point 304. If the PSU is already on, then the clock pulse sensing circuitry continues to monitor the incoming signal for a clock pulse 310. If, at 310, the clock pulse is no longer detected from the signal, then at 308 the PSU is powered off.

Figure 4:
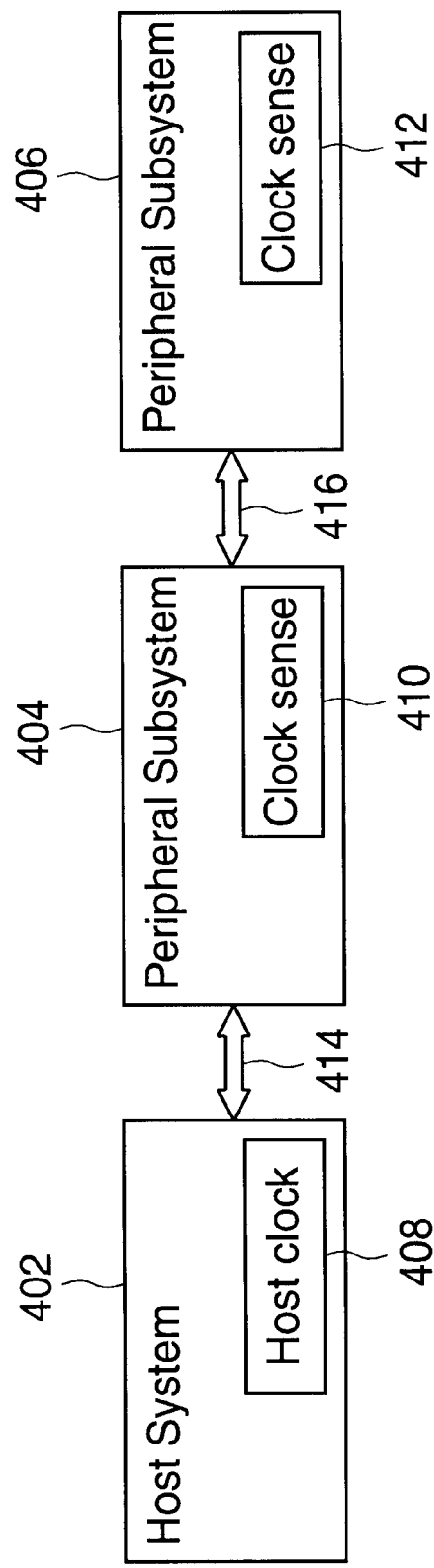
FIG. 4 is block diagram of another embodiment showing a peripheral subsystem connected with a second peripheral subsystem according to the present invention.

FIG. 4 shows another embodiment of the present invention. Here, a host system 402 is connected through a transmission medium 414 to a first peripheral subsystem 404. First peripheral subsystem 404 in turn in also connected via a second transmission medium 416 to a second peripheral subsystem 406. Host system 402 may be any type of computer system designed to include a host processor, memory and a host peripheral device bus such as those described in connection with FIG. 1.

Transmission media 414 and 416 may be a coaxial cable, fiber optic cable, or twisted pair, for example. In one embodiment, this may be a high speed serial link. The data transmission protocol might be for example Ethernet, or Fiber Channel. In still other embodiments, the physical connection (transmission media 414 and 416) may be foregone and instead it could be a wireless transmission protocol such as those described by industry standards like IR or Bluetooth transmits a signal from the host system 402 to the peripheral subsystem 404. Transmission medium 414 transmits a signal between host system 402 and first peripheral subsystem 404. Transmission medium 416 transmits a signal between first peripheral subsystem 404 and second peripheral subsystem 406.

Host system 402 further includes a PCI local bus, and the PCI local bus includes a PCI clock signal. Through an interface card installed into a peripheral device slot in the host system to an interface card installed in peripheral device slot in the expansion system, this PCI clock signal is transmitted from the host system 402 to peripheral subsystem 404 across transmission media 414. Clock sense circuitry 410 in first peripheral expansion system 404, such as that described in connection with FIG. 2, senses if a clock signal is present (or not present) which would trigger a power up or power down of the peripheral subsystem. First peripheral subsystem 404 further includes its own local bus for connection to peripheral devices, for example a PCI local bus. Through another interface card connected into one of the PCI slots in the expansion system, the PCI signal is transmitted further downstream over transmission media 416 to second peripheral subsystem 406. Second peripheral subsystem 406, like first peripheral subsystem 404 also includes clock sense circuitry 412, such as that described in connection with FIG. 2. As with the first peripheral subsystem 404, the sensing circuitry 412 in the second peripheral subsystem 406 will detect a clock pulse on the incoming signal over transmission media 416, and either power on or power off if necessary.

In another embodiment of the present invention, a peripheral subsystem will power up if it is cabled or otherwise connected to a powered on host system or a powered on peripheral subsystem. Conversely, the peripheral subsystem will automatically power itself off if the transmission media upon which the incoming signal is monitored is disconnected from the peripheral subsystem.

The foregoing description of the preferred embodiment has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A peripheral subsystem for extending a host peripheral component interconnect (PCI) bus of a host system to connect with a plurality of peripheral devices, the peripheral subsystem comprising:
   a power supply unit for supplying power to the peripheral subsystem;
   a remote PCI bus;
   a signal processor relaying signals from the host PCI bus to the remote PCI bus;
   a plurality of expansion slots located off the remote PCI bus,each of the plurality of expansion slots adapted to connect with one of the plurality of peripheral devices;
   a low pass filter receiving an incoming signal from the host system;
   a comparator circuit comparing the filtered incoming signal against a threshold value;
   a power up circuit that is triggered by the comparator circuit to power on the power supply if the filtered incoming signal exceeds the threshold value; and
   a power down circuit that is triggered by the comparator circuit to power off the power suppy if the filtered incoming signal does not exceed the threshold value.

2. The peripheral subsystem of claim 1, wherein the incoming signal is a clock pulse from the host system.

3. The peripheral subsystem of claim 2, wherein the clock pulse is a PCI clock pulse.

4. The peripheral subsystem of claim 1, wherein the threshold value is 2.5 volts.

5. The peripheral subsystem of claim 1, wherein the threshold value is 3.1 volts.

6. The peripheral subsystem of claim 1, wherein the low pass filter comprises a resistor and a capacitor.

7. The peripheral subsystem of claim 6, wherein the resistor is connected betweeen the host system and the comparator circuit in series and wherein the capacitor and the comparator are connected with the host system in parallel.

8. The peripheral subsystem of claim 1, wherein the host system is entirely powered up after the peripheral subsystem has entirely been powered up by the power supply.

9. A peripheral component interconnect (PCI) computer architecture comprising:
   a host system comprising a processor, a memory, and a host peripheral component interconnect (PCI) bus;
   a peripheral expansion system comprising a power supply unit for supplying power to a plurality of peripheral devices, a remote PCI bus, a remote signal processor, and a plurality of expansion slots located off the remote PCI bus, each of the expansion slots adapted to connect with one of the peripheral devices; and
   a power cycling element in the remote signal processor, the power cycling comprises:
      a low pass filter receiving an incoming signal from the host system;
      a comparator circuit comparing the filtered incoming signal against a threshold value;
      a power up circuit that is triggered by the comparator circuit to power on the power supply if the filtered incoming signal exceeds the threshold value; and a power down circuit that is triggered by the comparator circuit to power off the power supply if the filtered incoming signal does not exceed the threshold value.

10. The PCI computer architecture of claim 9, wherein the filtered incoming signal that passes through the low pass filter is a voltage.

11. The PCI computer architecture of claim 10, wherein the threshold value is 2.5 volts.

12. The PCI computer architecture of claim 11, wherein the threshold value is 3.1 volts.

13. The PCI computer architecture of claim 12, wherein the incoming signal is a clock pulse from the host system.

14. The PCI computer architecture of claim 13, wherein the clock pulse is a PCI clock pulse.

15. The PCI computer architecture of claim 9, further comprises:

a second peripheral expansion system comprising a second power supply unit, a second remote PCI bus, a second remote signal processor, and a plurality of second expansion slots located off the second remote PCI bus, and a second power cycling element in the second remote signal processor, the second power cycling comprises:
a second low pass filter receiving a second incoming signal;
a second comparator circuit comparing the filtered second incoming signal against a second threshold value;
a second power up circuit that is triggered by the second comparator circuit to power on the second power supply if the filtered second incoming signal exceeds the second threshold value; and
a second power down circuit that is triggered by the second comparator circuit to power off the second power supply if the filtered second incoming signal does not exceed the second threshold value.

16. The PCI computer architecture of claim 15, wherein the second peripheral expansion system and the peripheral expansion system are connected with the host system in a cascade configuration.

17. The PCI computer architecture of claim 15, wherein the second peripheral expansion system is entirely powered up by the second power supply before the host system is entirely powered up.

18. The PCI computer architecture of claim 9, further comprises a host interface card, wherein the host system comprise a plurality of PCI slots and wherein the host interface card is installed into one of the PCI slots.

19. The PCI computer architecture of claim 18, further comprises a transmission medium, wherein the host interface card connect the host system and the peripheral expansion system over the transmisson medium to allow the host system to send signals to the peripheral expansion system.

20. The PCI computer architecture of claim 9, wherein the host system is a thin network server.

* * * * *